Oct. 15, 1963    J. R. ALBURGER    3,107,298
APPARATUS FOR THE MEASUREMENT OF FLUORESCENT TRACER SENSITIVITY
Filed Nov. 9, 1960    4 Sheets-Sheet 1

INVENTOR.
JAMES R. ALBURGER
BY
ATTORNEY

Oct. 15, 1963     J. R. ALBURGER     3,107,298
APPARATUS FOR THE MEASUREMENT OF FLUORESCENT TRACER SENSITIVITY
Filed Nov. 9, 1960     4 Sheets-Sheet 2

INVENTOR.
JAMES R. ALBURGER
BY
ATTORNEY

United States Patent Office 3,107,298
Patented Oct. 15, 1963

3,107,298
APPARATUS FOR THE MEASUREMENT OF
FLUORESCENT TRACER SENSITIVITY
James R. Alburger, 5007 Hillard Ave., La Canada, Calif.
Filed Nov. 9, 1960, Ser. No. 68,267
8 Claims. (Cl. 250—71)

This invention relates to test and measurement apparatus for fluorescent penetrants used in the detection of flaws in metals, non-metallic bodies, and small surface openings in solid and non-porous materials.

The method and apparatus are particularly suitable for determining by both comparison and by absolute measurement, the sensitivity of thin film fluorescent penetrant tracers. The method utilizes a meniscus technique, since the ability of fluorescent tracers to respond to ultra-violet light and show fluorescence is governed by the film thickness and a fluorescent sensitivity factor. The higher the fluorescent sensitivity, the thinner the film may be and still show fluorescence.

In testing parts for surface flaws by the fluorescent penetrant test method, the fluorescent penetrant tracer enters the flaws and later exudes as a thin film of tracer which can be seen by its fluorescence under black light. For extremely small flaws, the amount of available tracer may be too small to provide an exuded film or an entrapment of tracer having a sufficient thickness to produce fluorescence. Therefore, a measurement of the threshold thickness of a film in a given fluorescent penetrant, below which the tracer ceases to fluoresce, provides a measure of the ability of the penetrant to detect flaws of a given dimension.

The meniscus test apparatus utilizes either a curved lens surface in contact with a platten having a flat surface or two flat surfaces at a slight angle to one another. A drop of fluorescent tracer placed at the contact point forms a meniscus-shaped film having a continuous range of film thicknesses.

At the point of contact between the curved lens and the flat platten or the two flat surfaces, the film thickness is subsantially zero, and the fluorescence is, therefore, substantially zero. As we move away from the point of contact, fluorescence suddenly appears at a well defined distance so that a non-fluorescent black spot appears in a fluorescent field. The diameter or width of this spot is, therefore, a measure of the sensitivity of the tracer.

For qualitative tests, two flat plattens with respective curved lens surfaces may be used, one of which may indicate the sensitivity of a standard tracer, while the other indicates the sensitivity of the tracer being tested. Any difference in the size of the black spots will serve as a measure of relative sensitivity, the test penetrant showing an equal or smaller spot diameter or width in order to qualify as equal sensitivity or better.

One modification of the apparatus also provides an absolute measurement of sensitivity, as will be explained hereinafter.

The principal object of the invention, therefore, is to facilitate the measurement of relative sensitivities between fluorescent penetrant tracers.

Another object of the invention is to facilitate the absolute measurement of the sensitivity of a fluorescent penetrant tracer.

A further object of the invention is to provide an improved system and apparatus for measuring the relative and absolute sensitivities of different fluorescent penetrant tracers.

A better understanding of this invention will be had from the following description when read in connection with the accompanying drawings in which:

FIG. 6 is a plan view of a modification of the device shown in FIGS. 1 and 1a;

Figure 1:
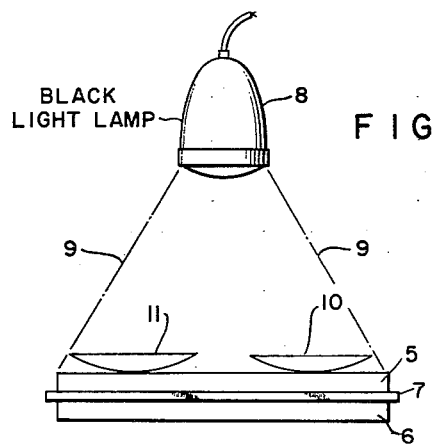
FIG. 1 is a plan view of the apparatus embodying the invention for measuring the relative sensitivities between two penetrant tracers.
Figure 1A:
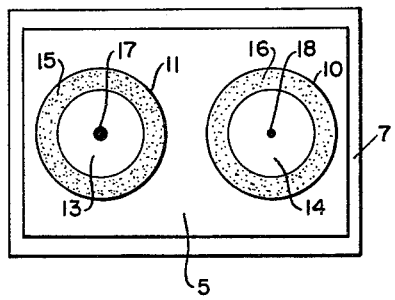
FIG. 1a is an elevational view of the apparatus shown in FIG. 1 and shows one way of applying black light to the apparatus.

Referring, now, to the drawings in which the same reference numerals refer to the same elements, FIGS. 1 and 1a show a pair of flat plattens 5 and 6 between which is placed a non-reflective and non-fluorescent film 7. Positioned on top of the plattens are two lenses 10 and 11 having convex surfaces on one side and planar surfaces on the other side, although double convex lenses could be used. These lenses are ground so that they have a known radius of curvature, a preferred radius being 106 cm. Although the lenses 10 and 11 have been shown as spherical lenses, they may also be half lenses, as will be described hereinafter.

Drops of the two tracers to be compared are now placed at the contact points of the lenses with the upper platten 5 and impressed with black light by a black light lamp 8, as shown by the outer rays 9 of the beam. The lamp may be energized in any suitable manner. Black spots as shown at 17 and 18 will now appear at the centers of luminous areas 13 and 14, respectively. The areas 15 and 16 surrounding the luminous areas 13 and 14 will be dark. If spot 17 is a standard tracer under lens 11, to be of equal sensitivity, the spot 18 must be equal or smaller in diameter than the spot 17, spot 18 being shown as smaller than spot 17. This apparatus provides a rapid test of relative sensitivities of two penetrant tracers.

In the apparatus shown in FIGS. 2 and 3, and specifically in FIG. 2, half lenses 20 and 21, of the plano-convex type, are positioned over non-reflective and non-fluorescent plattens 22 and 23, respectively, and may be used for the simple comparison test of tracers just described in connection with FIGS. 1 and 1a. The plattens 22 and 23 are shown circular and are suitably attached to a base plate 24, although these plattens may be of other shapes.

Figure 2:
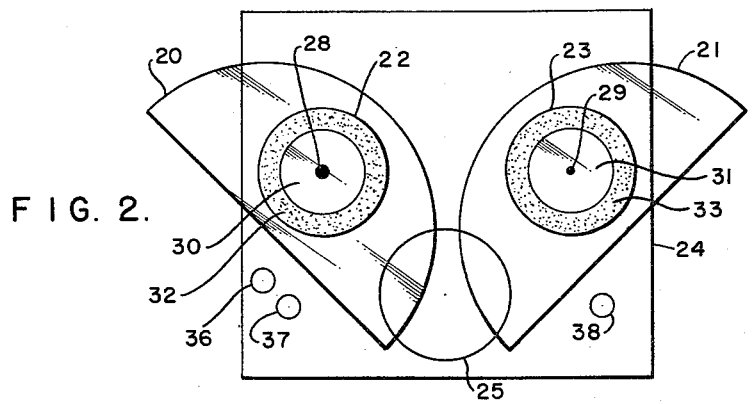
FIG. 2 is a diagrammatic plan view of another modification of the invention in which the relative values of sensitivity may be measured.

In FIG. 2, under black light impressed as shown in FIG. 1a, black spots 28 and 29 with luminous areas 30 and 31 and dark areas 32 and 33, similar to corresponding spots and areas in FIG. 1, will appear in accordance with the sensitivity characteristics of the tracers. Thus, the arrangement of plattens and lenses shown in FIG. 2, will provide a qualitative comparison of sensitivities of two penetrant tracers. Furthermore, absolute measurement of the diameter of the spots may be made with a needle caliper which is positioned over a spot so that the tips of the caliper shadows fall on the edge of the spot. A magnifying glass may be used. The distance between the caliper tips is then measured.

Figure 3:
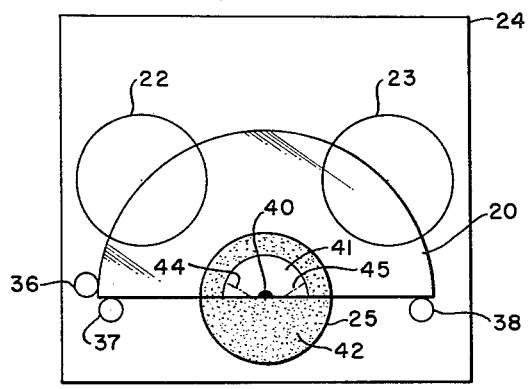
FIG. 3 is a diagrammatic plan view of the apparatus shown in FIG. 2 in which the absolute value of sensitivity of a penetrant tracer may be measured.

By placing one of the half lenses, such as 20 shown in FIG. 3, emulsifier and washing actions may be correlated.

The lens 20 is positioned by stops 36, 37 and 38, and a test spot is shown at 40 with its luminous area 41 and dark area 42. The lens 20 is adjusted so that the surface of the platten 25 is tangent to the curved surface of the half lens at the edge thereof, one type of adjusting means being shown in FIGS. 4 and 5. This adjustment may be made by viewing the reflection of light from the platten and noting the Newton rings which are formed at the contact point. By applying various emulsifiers, their action may be observed as shown by lines 44 and 45, which indicate the distances to which an applied emulsifier has penetrated. This test is also made under black light as shown in FIG. 1a.

Figure 4:
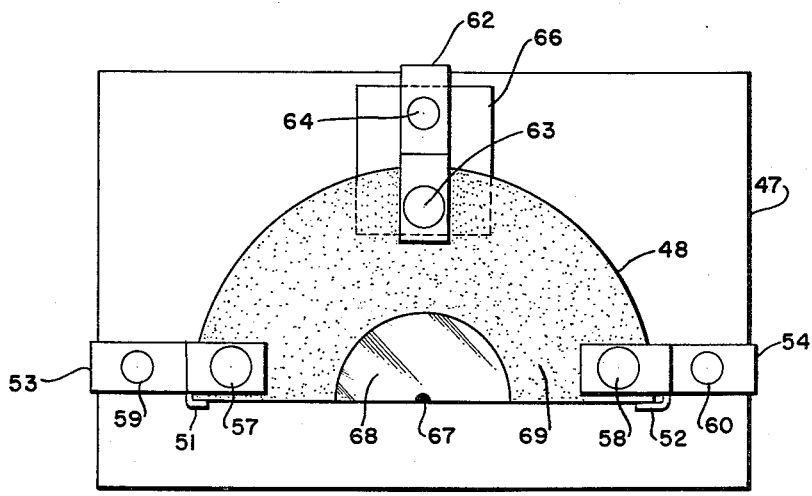
FIG. 4 is a plan view of the device shown diagrammatically in FIG. 3.
Figure 5:
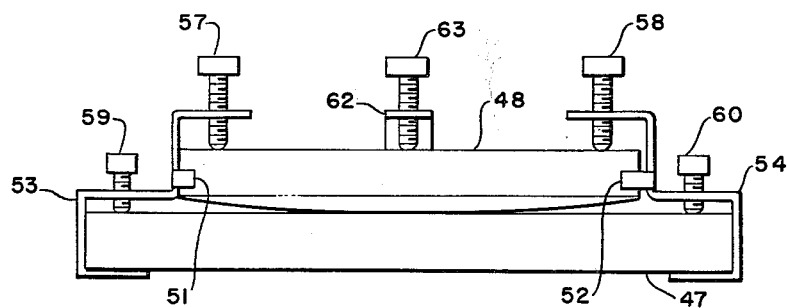
FIG. 5 is an elevational view of the device shown in FIG. 4.

Referring, now, to FIGS. 4 and 5, a half lens adjusting arrangement is shown. In this device, a glass plate 47 serving as a platten has positioned thereon a half lens 48 which is located on the plate by stops 51 and 52 as shown on clamps 53 and 54, respectively, these clamps having tilt adjusting screws 57 and 58 and locking screws 59 and 60. The glass plate 47 may be laminated with a non-reflective and non-fluorescent film as shown in FIG. 1a, or the transparent plate may be placed on any black sheet such as carbon paper. A rear clamp 62 is provided with a tilt adjusting screw 63 and a locking screw 64. To obtain the desired tilt adjustment to bring the surface of the plate tangent to the diameter edge of the half lens 48, a shim 66 is used to raise and lower the rear of the lens 48 in cooperation with screw 63. In FIG. 4, a black spot 67 is shown with a luminous area 68 and dark area 69. This adjusting arrangement may be used in FIG. 3 where a platten insert is employed.

Figure 6:
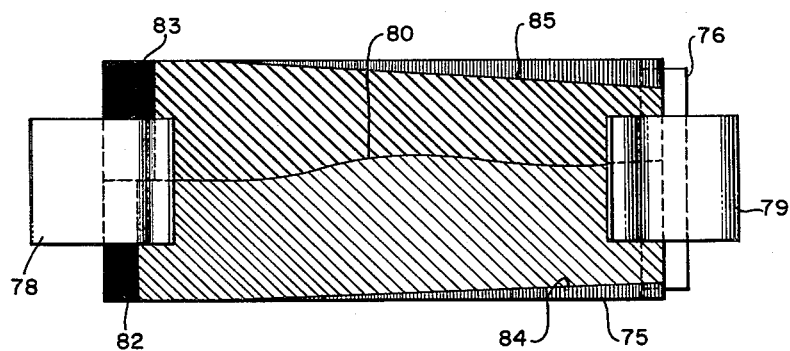
Figure 7:
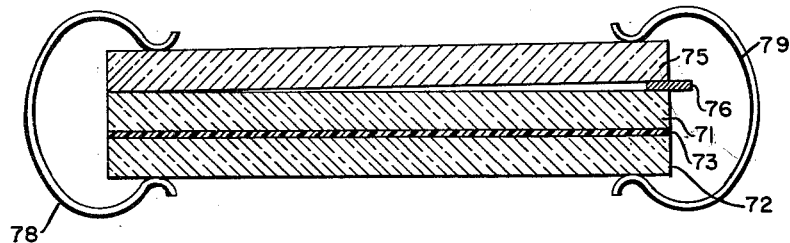
FIG. 7 is an elevational view of the modification shown in FIG. 6.

In FIGS. 6 and 7, the modification shown includes two glass plates 71 and 72 laminated with an opaque film 73 similar to the base shown in FIG. 1a. A single glass plate over a dark or non-fluorescent background may also be used. Positioned on base 71—72—73 is a transparent glass plate 75, whose lower surface is at a slight angle to the upper surface of plate 71 provided by a very thin shim 76. The plate 75 and base 71—72—73 are held in assembly by spring C clamps 78 and 79. This device may be used to compare penetrant tracers by applying one tracer to one edge of the device and the other tracer to the opposite edge thereof. The tracers are then permitted to flow into the wedge-shaped space until they meet, as shown by the irregular line 80. The relative sensitivities may now be readily observed by comparing the two dark areas 82 and 83 under black light as shown in FIG. 1a. The widths of dark areas 83 and 82 correspond to the radii of the spots 17 and 18, respectively, in FIG. 1, or spots 28 and 29 in FIG. 2.

In addition, this modification is particularly suitable for evaluating the behavior of different emulsifiers as employed in penetrant processes. This is accomplished by applying two different emulsifiers to the edges of the device in the same manner as the tracers were applied. The degree of penetration or stripping effect may be observed by lines of color change and their position as indicated by lines 84 and 85 and the hatched sections for green and red. Both upper and lower wedge-shaped sections will be pink or red, while the difference in penetrants will appear by the varying hues of green, as shown by the different widths of the cross-hatching.

Figure 8:
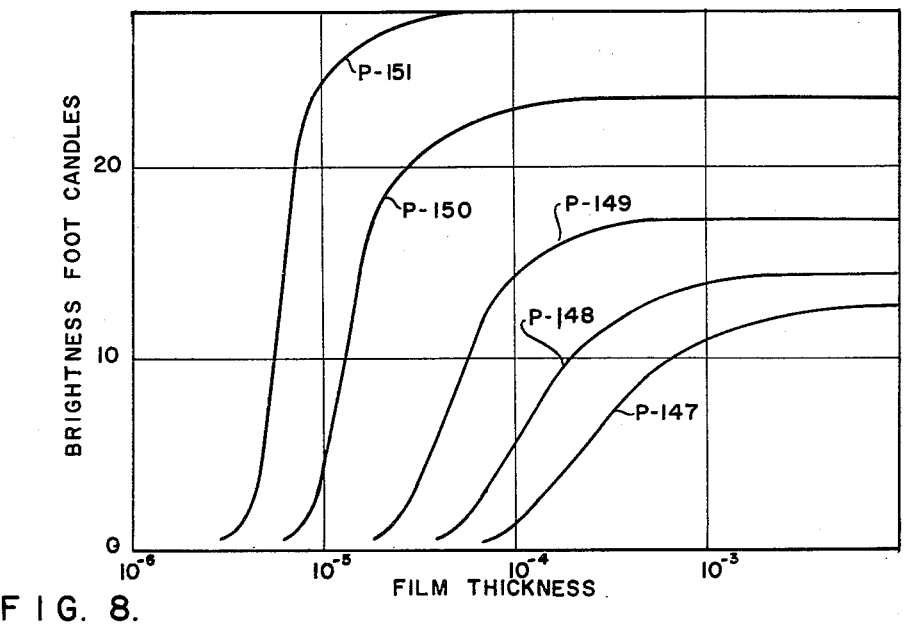
FIG. 8 is a graph showing the results of measurements with the apparatus shown in FIGS. 1 to 7, inclusive.

Referring, now, to FIG. 8, the five curves indicate measurements of five different formulations of fluorescent penetrants measured between film thickness and brightness in foot candles. Five typical formulations indicated as P–147, P–148, P–149, P–150, and P–151, are described in detail in my copending application, Serial No. 149,061, filed October 31, 1961. The graph shown in FIG. 8 illustrates the measurements which may be made with the method and apparatus described above to determine the positions of the toes of the different curves, the remainder of the curves being determined by other tests.

Figure 9:
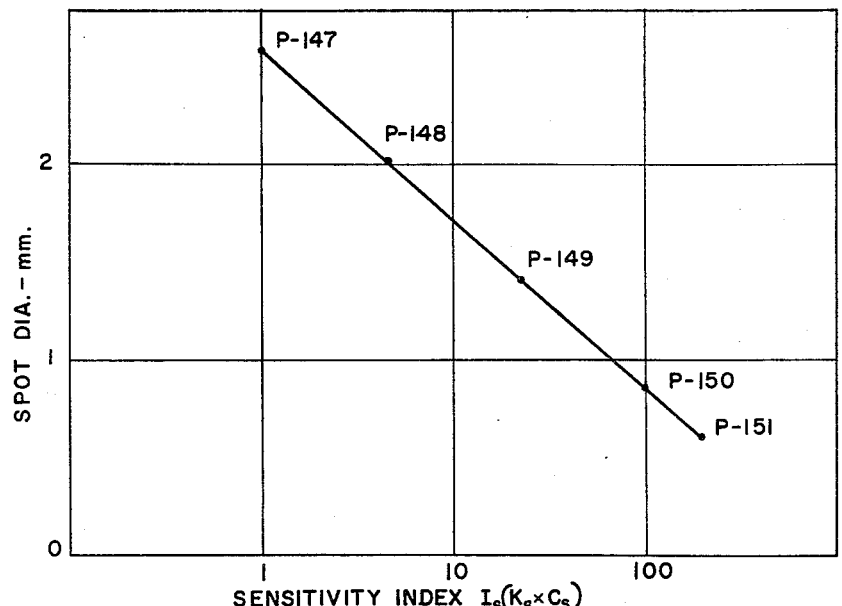
FIG. 9 is a graph showing the relationship between the sensitivity indices and the spot diameters or widths as measured with the apparatus of the invention.

In FIG. 9, a graph between sensitivity index and spot diameter or widths in millimeters as measured with the apparatus described above is illustrated, the points indicated being for the same formulations shown in FIG. 8, which lie on an approximately straight line, although some other tracer systems may show curved characteristics. This sensitivity index is described in detail in the above-mentioned copending application.

By the use of the above apparatus, which will provide not only a rapid determination of relative sensitivities between a standard penetrant tracer and test tracers, and between different test tracers, the proper formulation to be used for detection of various size flaws or porosities in the surfaces of materials may be rapidly and accurately selected so as to provide the optimum penetrant for a certain application. With this information, the maximum degree of detection may be accomplished by the selection of the optimum penetrant for a certain situation.

I claim:

1. Apparatus for determining the threshold of fluorescence of a fluorescent tracer comprising at least one flat platten, a transparent element mounted on said platten having a contact with said platten and having an adjacent surface of said element varying in distance from the adjacent surface of said platten starting from said contact, and means for impressing said transparent element with black light, said fluorescent tracer being adapted to be positioned between said surfaces to provide fluorescent and non-fluorescent areas of sizes dependent upon the threshold of fluorescence of said tracer.

2. Apparatus in accordance with claim 1 in which said platten is rendered non-fluorescent and said varying surface of said transparent element is the curved surface of a lens.

3. Apparatus in accordance with claim 1 in which said platten is rendered non-fluorescent and said varying surface of said transparent element is a flat surface at a slight angle to the flat surface of said platten.

4. Apparatus in accordance with claim 1 in which said platten is rendered non-fluorescent and said transparent element is a half lens, the surface of said platten being tangent to the curved surface of said half lens at the edge thereof for determining the rates of penetration of said tracer and emulsifier for determining the behavior thereof.

5. Apparatus for comparing the relative thresholds of fluorescence of two penetrant tracers comprising means for providing an extended flat platten area surface, a pair of transparent elements having one point of each in contact with a respective point on said area surface and each having a surface which equally varies in distance from said area surface starting from the points of contact between said elements and said area surface, a penetrant tracer being adapted to be placed at the point of contact between each of said elements and its respective contact with said area surface and extending between the adjacent surfaces thereof, and means for observing the sizes of the non-fluorescent areas of said tracers, the relative sizes of said non-fluorescent areas indicating the difference in the thresholds of fluorescence of said tracers.

6. Apparatus in accordance with claim 5 in which said pair of transparent elements are two lenses having the same curved surfaces.

7. Apparatus for determining the sensitivity of a penetrant tracer by determining its threshold of fluorescence comprising a platten having a flat surface, a half lens having a uniform curved surface in contact with said flat surface at one point thereon, means for adjusting said contact point so that said flat surface is tangent to said curved surface at the edge thereof, means for flooding said lens with black light, said penetrant tracer being placeable at said contact point and permitted to flow outwardly between said flat surface and said curved surface to provide a layer of said tracer having a varying thickness, said tracer showing fluorescent and non-fluorescent areas under black light, said non-fluorescent area determining the threshold of fluorescence, the smaller this non-fluorescent area the higher the sensitivity of said tracer.

8. Apparatus for determining the dimensional threshold of color response of a liquid comprising at least one flat platten, a transparent element mounted on said platten having a contact with said platten and having an adjacent surface of said element continuously varying in distance from the adjacent surface of said platten starting from said contact, said liquid being adapted to be positioned between said surfaces to provide different colored areas, and means for illuminating said transparent element, platten and liquid for observing the sizes of said different colored areas to determine the dimensional threshold of color response of said liquid.

References Cited in the file of this patent

UNITED STATES PATENTS

| | | |
|---|---|---|
| 2,587,705 | De Forest | Mar. 4, 1952 |
| 2,593,391 | Bray | Apr. 15, 1952 |
| 2,995,923 | Ubbelohde | Apr. 15, 1961 |